(12) United States Patent
McKelroy

(10) Patent No.: US 7,610,847 B2
(45) Date of Patent: Nov. 3, 2009

(54) PUMP CROSSHEAD AND CONNECTING ROD ASSEMBLY

(75) Inventor: Rondall B. McKelroy, Stephenville, TX (US)

(73) Assignee: FMC Technologies, Inc., Houston, TX (US)

( * ) Notice: Subject to any disclaimer, the term of this patent is extended or adjusted under 35 U.S.C. 154(b) by 305 days.

(21) Appl. No.: 11/821,999

(22) Filed: Jun. 25, 2007

(65) Prior Publication Data

US 2008/0006148 A1    Jan. 10, 2008

Related U.S. Application Data

(60) Provisional application No. 60/816,992, filed on Jun. 27, 2006.

(51) Int. Cl.
*F16C 5/00* (2006.01)
*F16J 1/10* (2006.01)

(52) U.S. Cl. .......................................... 92/140; 92/187

(58) Field of Classification Search .................. 92/140, 92/187, 191
See application file for complete search history.

(56) References Cited

U.S. PATENT DOCUMENTS

| | | |
|---|---|---|
| 4,500,262 A | 2/1985 | Sugino et al. |
| 4,553,298 A | 11/1985 | Grable |
| 4,872,395 A * | 10/1989 | Bennitt et al. .................. 92/139 |
| 5,246,355 A * | 9/1993 | Matzner et al. .............. 417/521 |
| 5,247,873 A * | 9/1993 | Owens et al. .................. 92/187 |
| 5,507,219 A | 4/1996 | Stogner |
| 5,560,332 A * | 10/1996 | Chang ...................... 123/197.3 |
| 5,839,888 A | 11/1998 | Harrison |
| 6,571,684 B1 * | 6/2003 | Nov et al. ...................... 92/187 |

* cited by examiner

Primary Examiner—Thomas E Lazo
(74) Attorney, Agent, or Firm—Henry C. Query, Jr.

(57) ABSTRACT

A crosshead and connecting rod assembly for a pump comprises a connecting rod which includes a first end that is rotatably connected to the crankshaft of the pump, a second end that comprises a generally cylindrical configuration, and a shaft that extends between the first and second ends. The second end comprises at least one annular shoulder adjacent to the shaft, and the crosshead and connecting rod assembly further comprises a crosshead which includes a body that comprises a generally semi-cylindrical socket within which the second end is rotatably received and at least one trunnion that comprises a generally semi-cylindrical recess which aligns with the socket and within which the shoulder is rotatably received when the trunnion is connected to the body.

17 Claims, 3 Drawing Sheets

PUMP CROSSHEAD AND CONNECTING ROD ASSEMBLY

This application is based on and claims the benefit of U.S. Provisional Patent Application No. 60/816,992 filed on Jun. 27, 2006.

BACKGROUND OF THE INVENTION

The present invention relates to reciprocating plunger and piston-type pumps which are used, for example, in the well service industry. In particular, the invention relates to the connecting rod and crosshead assembly which converts the rotary motion generated at the power end of the pump into linear reciprocal motion which drives the plungers in the fluid end of the pump.

Prior art reciprocating pumps for the well service industry include a crankshaft which generates rotary motion and a slider crank mechanism to convert this rotary motion into linear reciprocating motion. The crankshaft is connected to a slider, which is commonly called a crosshead, by means of a connecting rod. The connecting rod is coupled to the crosshead with some type of joint which allows force to be transferred between these components in an oscillating fashion.

The most common joint design is that of a pin and bushing. The pin is typically referred to as a wrist pin. It is fixed in the crosshead and passes through a bushing or bearing in the connecting rod. In operation, force is transferred across the surface of the bushing to the mating surface of the wrist pin. This design works well when the unit load rating of the busing is sufficient to carry the total force of the connecting rod without distorting or rapidly wearing. However, the fact that the motion of the wrist pin relative to the bushing is oscillatory limits the ability of the bushing to develop a sufficient oil film for good lubrication.

Other prior art designs have been devised to provide a larger load bearing surface between the connecting rod and the crosshead. In one prior art joint, the end of the connecting rod forms a cylinder which engages a semi-cylindrical bushing that is embedded in the crosshead. However, this bushing is able to transfer the forces between the connecting rod and the crosshead only during the discharge stroke of the pump. Consequently, another mechanism must be used to transfer the forces between the connecting rod and the crosshead during the suction stroke of the pump.

One such mechanism comprises a small pin similar to a wrist pin which extends through both the connecting rod and the crosshead. However, this requires the crosshead to be wider than the connecting rod bearing surface, which necessarily increases the crosshead diameter and, consequently, the overall width of the pump. Furthermore, as the half bushing between the connecting rod and the crosshead wears in service, the small pin may begin to carry a portion of the force from the connecting rod that it is not designed to carry, and this may cause the pin to fail.

Thus, none of these designs for coupling the connecting rod to the crosshead provides an optimum means for transferring the forces between these components during both the discharge stroke and the suction stroke.

SUMMARY OF THE INVENTION

In accordance with the present invention, a crosshead and connecting rod assembly for a pump is provided which comprises a connecting rod having a first end which is rotatably connected to the crankshaft of the pump, a second end which comprises a generally cylindrical configuration, and a shaft which extends between the first and second ends. The second end comprises at least one annular shoulder adjacent to the shaft, and the crosshead and connecting rod assembly further comprises a crosshead which includes a body that comprises a generally semi-cylindrical socket within which the second end is rotatably received and at least one trunnion that comprises a generally semi-cylindrical recess which aligns with the socket and within which the shoulder is rotatably received when the trunnion is connected to the body.

In accordance with one embodiment of the invention, the axial length of the socket may be approximately equal to the axial length of the second end, and the diameter of the semi-cylindrical recess may conform to the diameter of the second end.

In accordance with another embodiment of the invention, the second end may comprise a pair of first and second annular shoulders located adjacent to and on opposite sides of the shaft, and the crosshead may comprise a pair of first and second trunnions which each comprise a generally semi-cylindrical recess which aligns with the socket and within which a corresponding one of the first and second shoulders is rotatably received when the first and second trunnions are connected to the body.

In accordance with yet another embodiment of the invention, the body may comprise a first end nearest the plunger, a second end nearest the crankshaft and a pair of first and second arcuate portions which are located on diametrically opposite sides of the second end and which are slidably received within a guide cylinder that is located between the crankshaft and the plunger. Moreover, the first and second arcuate portions may extend longitudinally substantially between the first and second ends of the body. Furthermore, the body may comprise a generally rectangular middle portion which is located between the first and second arcuate portions and within which the socket is formed.

Thus, the present invention provides a crosshead and connecting rod assembly which presents a relatively large surface area between these components for the discharge stroke of the pump and a smaller yet relatively large surface area between these components for the suction stroke of the pump. As a result, the bearing stresses between the connecting rod and the crosshead are reduced and the life of these components is consequently increased.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE INVENTION

Figure 1:
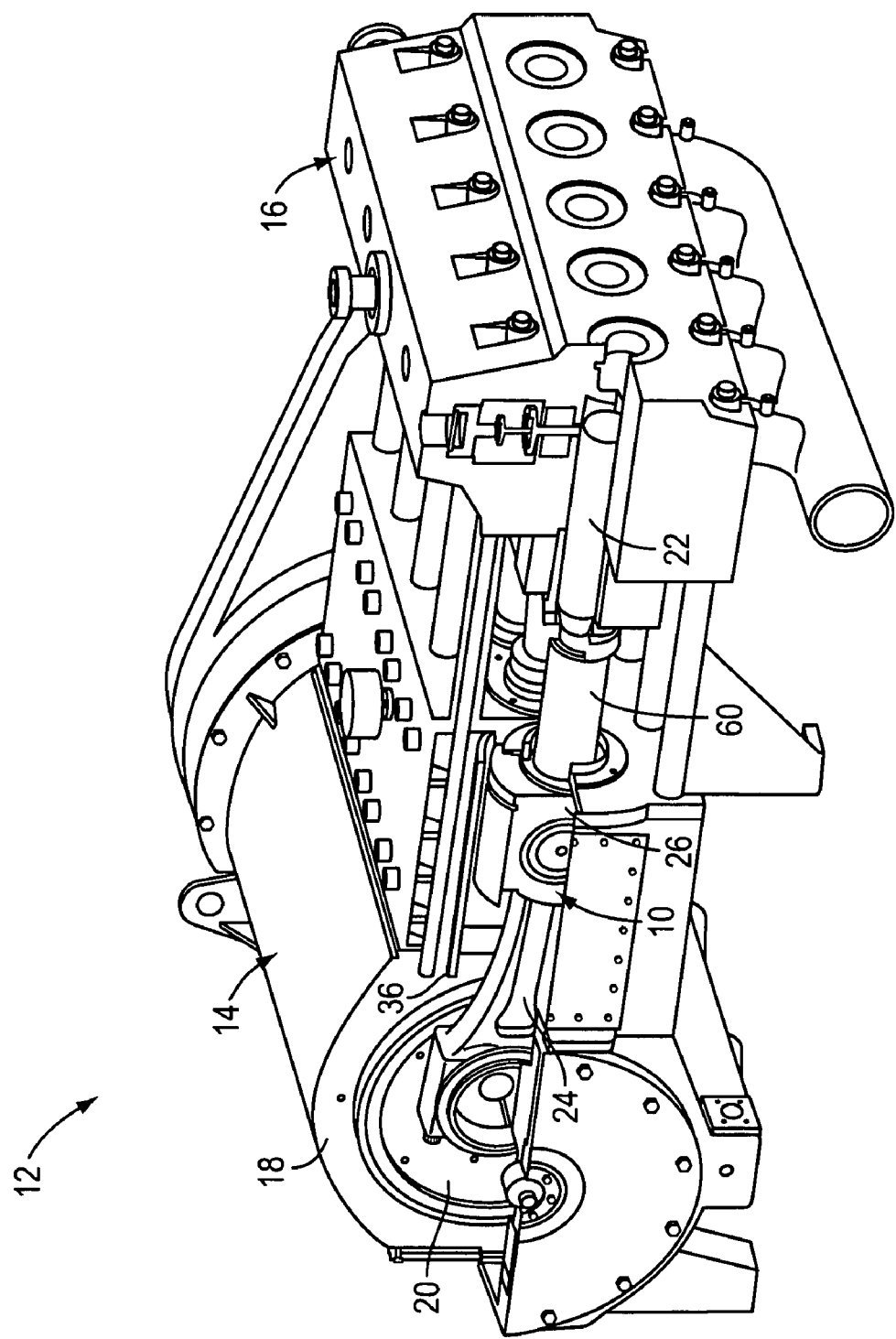
FIG. 1 is a perspective, partial cut-away view of an exemplary plunger pump which incorporates the connecting rod and crosshead assembly of the present invention.

Referring to FIG. 1, the crosshead and connecting rod assembly of the present invention, which is indicated generally by reference number 10, is shown installed in an exemplary plunger pump 12. The pump 12 comprises a power end 14 for generating pumping power and a fluid end 16 for pumping a desired fluid. The power end 14 includes a gear reducer assembly 18 which is driven by a suitable motor (not shown), and a number of crankshafts 20 (only one of which is visible in FIG. 1) which are driven by the gear reducer assembly. The fluid end 16 includes a number of plungers 22, each of which is reciprocated within a corresponding plunger bore by a respective crankshaft 20.

Figure 2:
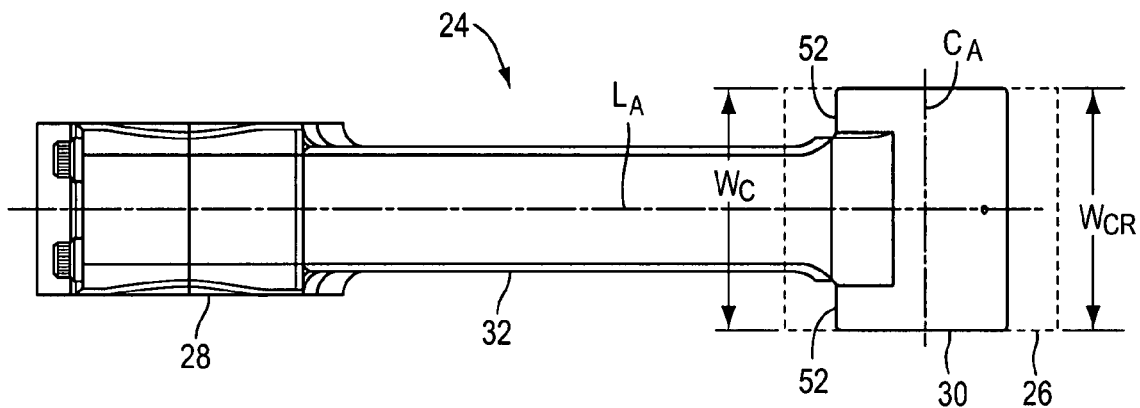
FIG. 2 is a top plan view of the connecting rod component of the present invention in which a schematic representation of the crosshead component of the invention is shown in phantom.
Figure 3:
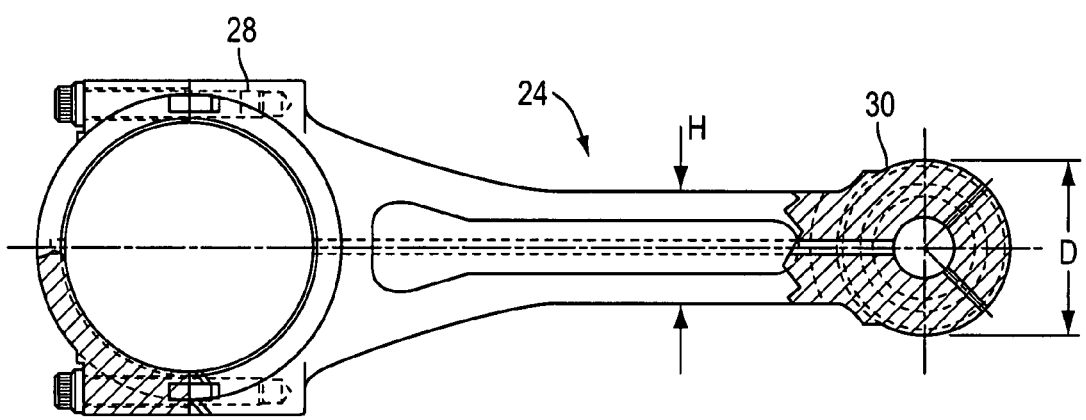
FIG. 3 is a side elevation view of the connecting rod shown in FIG. 2.

Each crankshaft 20 is connected to its corresponding plunger 22 by a crosshead and connecting rod assembly 10. As the name implies, each crosshead and connecting rod assembly 10 includes a connecting rod 24 and a crosshead 26. Referring also to FIGS. 2 and 3, the connecting rod 24 comprises first end 28 which is rotatably connected to the crankshaft 20 by conventional means, a second end 30 which is pivotally connected to the crosshead 26, and a shaft 32 which extends between the first and second ends. The second end 30 comprises a generally cylindrical configuration having a central axis $C_A$ which is approximately perpendicular to the longitudinal axis $L_A$ of the shaft 32. The diameter D of the second end 30 is optimally greater than the height H of the shaft 32, and the width $W_{CR}$, i.e., the axial length, of the second end is ideally approximately equal to the width $W_C$ of the crosshead 26.

Figure 4:
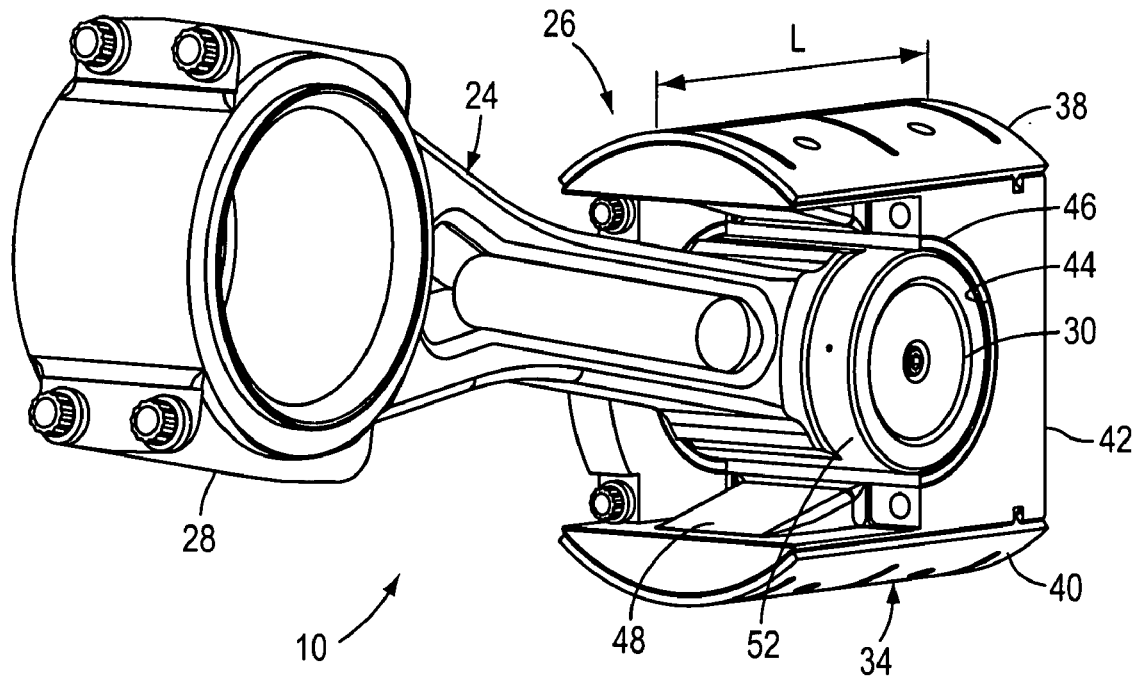
FIG. 4 is a perspective view of the connecting rod and crosshead assembly of the present invention, with one of the trunnion components of the invention removed to provide a clearer view of the interface between the connecting rod and the crosshead.
Figure 5:
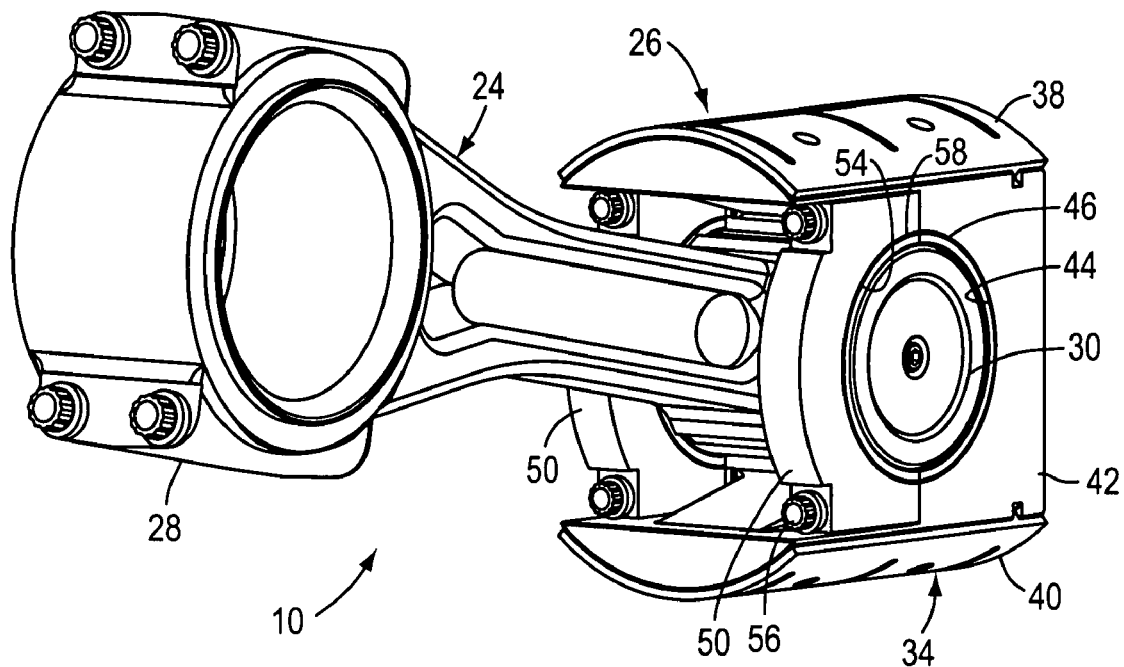
FIG. 5 is a perspective view of the connecting rod and crosshead assembly similar to FIG. 5, but with the missing trunnion replaced.

Referring also to FIGS. 4 and 5, each crosshead 26 comprises an annular body 34 which, as shown in FIG. 1, is slidably received within a guide cylinder 36 that is mounted in the power end 14 of the pump 12. The body 34 comprises a length L, arcuate top and bottom portions 38, 40 which each extend the length L, and a generally rectangular middle portion 42 which is disposed between the top and bottom portions and which extends approximately one-half the length L from the fluid-end side of the crosshead 26 to the pump-end side of the crosshead. The middle portion 42 includes a semi-cylindrical socket 44 within which the cylindrical second end 30 of the connecting rod 24 is rotatably received. If desired, the crosshead 26 may include a semi-cylindrical bushing or bearing 46 between the second end 30 and the socket 44 which may extend, e.g., approximately the entire width $W_C$ of the crosshead. In addition, the body 34 may comprise one or more fillets 48 between the middle portion 42 and each of the top and bottom portions 38, 40.

The cylindrical second end 30 of the connecting rod 24 is retained within its corresponding socket 44 by a pair of trunnions 50. As shown most clearly in FIG. 2, the difference in widths between the second end 30 and the shaft 32 defines a pair of annular shoulders 52. Each of these shoulders 52 is engaged by a corresponding semi-cylindrical recess 54 which is formed in a respective trunnion 40. Each trunnion in turn is secured to the body 34 of the crosshead 26 by suitable means, such as a pair of cap screws 56. If desired, a semi-cylindrical bushing or bearing 58 may be positioned between each trunnion 50 and its corresponding shoulder.

In operation of the pump 12, the rotary motion of the gear reducer 18 is converted into linear reciprocating motion by the connecting rods 24. The connecting rods 24 in turn reciprocate their respective crossheads 26 within their corresponding cylinders 36. As shown in FIG. 1, each crosshead 26 may be connected to its corresponding plunger 22 by a conventional plunger rod 60. Thus, the reciprocal motion of the crosshead 26 is transmitted directly to the plunger 22 to cause the plunger to reciprocate within its plunger bore.

During the discharge stroke of the pump 12, a relatively large drive force is transmitted between the connecting rod 24 and the crosshead 26 as the former drives the latter toward the fluid end 16 of the pump. However, since a relatively large semi-cylindrical surface exists between the second end 30 of the connecting rod 24 and the socket 44 of the crosshead 26, and since the width $W_{CR}$ of the second end 30 is approximately the same as the width $W_C$, i.e., the axial length, of the socket 44, a large bearing surface exists between these components through which this drive force is transmitted. Also, during the suction stroke of the pump 12, a significant yet smaller return force is transmitted between the connecting rod 24 and the crosshead 26 as the former pulls the latter back toward the power end 14 of the pump. However, since the interface between each trunnion 50 and its corresponding shoulders 52 is a semi-cylinder having the same diameter as the second end 30, a relatively large bearing surface exists between the second end and the trunnions through which this return force may be transmitted.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. In combination with a pump which includes at least one plunger that is reciprocated by a corresponding crankshaft, the improvement comprising a crosshead and connecting rod assembly which comprises:
    a connecting rod which includes:
        a first end which is rotatably connected to the crankshaft;
        a second end which comprises a generally cylindrical configuration; and
        a shaft which extends between the first and second ends;
        wherein the second end comprises at least one annular shoulder adjacent to the shaft; and
    a crosshead which is positioned between the connecting rod and the plunger and which includes:
        a body which comprises a generally semi-cylindrical socket within which the second end is rotatably received; and
        at least one trunnion which comprises a generally semi-cylindrical recess which aligns with the socket and within which the shoulder is rotatably received when the trunnion is connected to the body.

2. The combination of claim 1, wherein the axial length of the socket is approximately equal to the axial length of the second end.

3. The combination of claim 1, wherein the diameter of the semi-cylindrical recess conforms to the diameter of the second end.

4. The combination of claim 1, wherein the second end comprises a pair of first and second annular shoulders located adjacent to and on opposite sides of the shaft, and wherein the crosshead comprises a pair of first and second trunnions which each comprise a generally semi-cylindrical recess which aligns with the socket and within which a corresponding one of the first and second shoulders is rotatably received when the first and second trunnions are connected to the body.

5. The combination of claim 1, wherein the body comprises a first end nearest the plunger, a second end nearest the crankshaft and a pair of first and second arcuate portions which are located on diametrically opposite sides of the second end and which are slidably received within a guide cylinder that is located between the crankshaft and the plunger.

6. The combination of claim 5, wherein the first and second arcuate portions extend longitudinally substantially between the first and second ends of the body.

7. The combination of claim 6, wherein the body comprises a generally rectangular middle portion which is located between the first and second arcuate portions and within which the socket is formed.

8. The combination of claim 7, wherein the middle portion extends from the first end of the body toward the second end of the body approximately one-half the length of the first and second arcuate portions.

9. The combination of claim 7, wherein the trunnion is secured to the middle portion between the first and second arcuate portions.

10. In combination with a pump which includes at least one plunger that is reciprocated by a corresponding crankshaft, the improvement comprising a crosshead and connecting rod assembly which comprises:

a connecting rod which includes:

a first end which is rotatably connected to the crankshaft;

a second end which comprises a generally cylindrical configuration; and a shaft which extends between the first and second ends;

wherein the second end comprises a pair of first and second annular shoulder located adjacent to and on opposite sides of the shaft; and a crosshead which is positioned between the connecting rod and the plunger and which includes:

a body which comprises a generally semi-cylindrical socket within which the second end is rotatably received; and a pair of first and second trunnions which each comprise a generally semi-cylindrical recess which aligns with the socket and within which a corresponding one of the first and second shoulders is rotatably received when the first and second trunnions are connected to the body.

11. The combination of claim 10, wherein the axial length of the socket is approximately equal to the axial length of the second end.

12. The combination of claim 10, wherein the diameter of the semi-cylindrical recesses conforms to the diameter of the second end.

13. The combination of claim 10, wherein the body comprises a first end nearest the plunger, a second end nearest the crankshaft and a pair of first and second arcuate portions which are located on diametrically opposite sides of the second end and which are slidably received within a guide cylinder that is located between the crankshaft and the plunger.

14. The combination of claim 13, wherein the first and second arcuate portions extend longitudinally substantially between the first and second ends of the body.

15. The combination of claim 14, wherein the body comprises a generally rectangular middle portion which is located between the first and second arcuate portions and within which the socket is formed.

16. The combination of claim 15, wherein the middle portion extends from the first end of the body toward the second end of the body approximately one-half the length of the first and second arcuate portions.

17. The combination of claim 15, wherein the trunnion is secured to the middle portion between the first and second arcuate portions.

* * * * *